US008489625B2

(12) United States Patent
Ni et al.

(10) Patent No.: US 8,489,625 B2
(45) Date of Patent: Jul. 16, 2013

(54) MOBILE QUERY SUGGESTIONS WITH TIME-LOCATION AWARENESS

(75) Inventors: Xiaochuan Ni, Beijing (CN); Jian-Tao Sun, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 157 days.

(21) Appl. No.: 12/955,758

(22) Filed: Nov. 29, 2010

(65) Prior Publication Data

US 2012/0136855 A1 May 31, 2012

(51) Int. Cl.
*G06F 17/30* (2006.01)
(52) U.S. Cl.
USPC ......... 707/758; 707/724; 707/725; 455/456.1
(58) Field of Classification Search
USPC ........... 707/758, 724, 725, E17.012, 999.003, 707/999.01, 999.107; 455/456.1
See application file for complete search history.

(56) References Cited

U.S. PATENT DOCUMENTS

| 7,921,107 | B2* | 4/2011 | Chang et al. ................ 707/723 |
| 8,229,470 | B1* | 7/2012 | Ranjan et al. .............. 455/456.3 |
| 2002/0009978 | A1* | 1/2002 | Dukach et al. .................. 455/99 |
| 2007/0179863 | A1 | 8/2007 | Stoll |
| 2008/0208841 | A1* | 8/2008 | Zeng et al. ........................ 707/5 |
| 2008/0242279 | A1* | 10/2008 | Ramer et al. .............. 455/414.2 |
| 2008/0256056 | A1* | 10/2008 | Chang et al. ....................... 707/5 |
| 2009/0204634 | A1* | 8/2009 | Yoshii et al. ............. 707/103 R |
| 2009/0249198 | A1 | 10/2009 | Davis et al. |
| 2009/0276230 | A1 | 11/2009 | Smyers et al. |
| 2010/0114929 | A1* | 5/2010 | Bonchi et al. ................ 707/759 |
| 2010/0151882 | A1* | 6/2010 | Gillies et al. ............... 455/456.1 |
| 2010/0324994 | A1* | 12/2010 | Crawford ................... 705/14.58 |
| 2011/0106796 | A1* | 5/2011 | Svaic ........................... 707/728 |
| 2011/0161311 | A1* | 6/2011 | Mishne et al. ............... 707/719 |
| 2011/0202533 | A1* | 8/2011 | Wang et al. .................. 707/738 |
| 2011/0208814 | A1* | 8/2011 | Bostrom et al. .............. 709/204 |
| 2011/0225192 | A1* | 9/2011 | Imig et al. .................... 707/775 |
| 2011/0246306 | A1* | 10/2011 | Blackhurst et al. ........ 705/14.58 |
| 2011/0282798 | A1* | 11/2011 | Zheng et al. .................. 705/319 |

OTHER PUBLICATIONS

Abbar et al., "ContextAware Recommender Systems: A ServiceOriented Approach", VLDB Conference: International Workshop on Personalized Access, Profile Management, and Context Awareness in Databases (PersDB), Lyon, France, Aug. 2009, 6 pages, retreived on Aug. 18, 2010 at << http://persdb09.stanford.edu/proceedings/persdb-6.pdf>>.

(Continued)

*Primary Examiner* — Leslie Wong
(74) *Attorney, Agent, or Firm* — Lee & Hayes, PLLC (57) ABSTRACT

The techniques describe recommending mobile query suggestions by integrating time and location in response to a query input submitted on a mobile computing device. A process constructs a bipartite graph by extracting users that submitted queries from mobile search logs and associating time and location with the submitted queries. The process determines the users are similar having submitted similar queries at similar times and at similar locations. The process receives a query input associated with a current time and a current location of a mobile computing device. Next, the process computes a relatedness of candidate queries to the query input based on a similarity between the user groups having submitted both the candidate queries and the query input, and distances of times and locations at which the user previously issued the query input and the candidate queries.

17 Claims, 9 Drawing Sheets

OTHER PUBLICATIONS

Arias et al., "ContextBased Personalization for Mobile Web Search", VLBD Conference: International Workshop on Personalized Access, Profile Management, and Context Awareness in Databases (PersDB), Auckland, New Zealand, Aug. 2008, pp. 33-39, retrieved on Aug. 18, 2010 at <<http://persdb08.stanford.edu/5-PersDB-Paper.pdf>>.

Costa et al., "COReS: Context-aware, Ontology-based Recommender system for Service recommendation", 19th International Conference on Advanced Information Systems Engineering (CAISE'07), Workshop on Ubiquitous Mobile Information and Collaboration Systems, Trondheim, Norway, Jun. 11-15, 2007, 15 pages, retrieved on Aug. 18, 2010 at <<http://www.inf.ufes.br/~rguizzardi/publications/costa-guizz-guizz-gonc-UMICS07-cameraready.pdf.pdf>>.

Johnson, "Google Optimizes Mobile Search Suggestions Based on Location", Incisive Interactive Marketing LLC., Jan. 15, 2010, 3 pages, retrieved on Aug. 26, 2010 at <<http://blog.searchenginewatch.com/100115-124920>>.

Wang et al., "Mobile Location-based Information Pushing System", 10th WSEAS International Conference on Automation and Information (ICAI'09), Prague, Czech Republic, Mar. 23-25, 2009, pp. 348-353, retrieved on Aug. 18, 2010 at <<http://www.wseas.us/e-library/conferences/2009/prague/ICAI/ICAI54.pdf>>.

\* cited by examiner

Graph I. Example Query Traffic

MOBILE QUERY SUGGESTIONS WITH TIME-LOCATION AWARENESS

BACKGROUND

Search engine companies provide users with convenient search services, such as personal computer (PC) web searches. Recently, search engine companies are implementing mobile search engine applications for mobile computing devices. A mobile search differs from a PC web search in several ways. One difference is that a user tends to type shorter text input for a mobile search query, as inputting text on the mobile computing device is often difficult or awkward to do. Another difference is that the user conducting a mobile search often prefers that the returned search results relate to the time of the query and/or the current locations of the user. Yet another difference is that the results of the mobile search query are limited by the mobile computing device having less bandwidth and a much smaller screen to display the information than the PC.

Most of the afore-mentioned search engine companies simplify query input of mobile searches by offering query suggestions. For instance, as a user starts to enter text input, the search engine offers real-time query suggestions to help the user by offering a list of queries that are semantically related to the text string that the user is inputting. However, the mobile search engines tend to adapt the query suggestion techniques based on the PC web search without making changes to suit the needs of the mobile search query. Thus, it becomes difficult to integrate other factors when offering query suggestions for the mobile search query.

SUMMARY

This disclosure describes recommending mobile query suggestions by integrating time and location information in a response to a query input submitted on a mobile computing device. The recommendations for the mobile query suggestions integrate a current time and a current location of the mobile computing device when the query input is submitted.

In an implementation, a process constructs a bipartite graph by extracting queries from mobile search logs. The process identifies for each of the queries, a user that sent a query, a time at which the user sent the query and a location from which the user sent the query. The process calculates a similarity between the users based on the bipartite graph based at least in part on similarities between: (1) the queries, (2) times at which the users submitted the queries, and (3) locations from which the users submitted the queries. The process then receives from a mobile computing device of a particular user, a query input associated with a current time and a current location of the mobile computing device. The process may then identify candidate queries from the bipartite graph in response to the receiving of the query input, the candidate queries comprising at least a portion of the queries previously submitted by the users that have previously submitted the received query input. Next, the process computes a relatedness of each of the candidate queries to the query input, based at least in part on (1) a calculated similarity between a respective user that submitted the candidate query and the particular user, (2) a difference between the current time associated with the received query input and a time when the candidate query was submitted, and (3) a distance between the current location associated with the received query input and a location where the candidate query was submitted.

In another implementation, a process receives, from a mobile computing device of a particular user, a query input associated with a current time and with a current location of the mobile computing device. Based at least partly in response to the received query input, the process accesses a query-user graph constructed from mobile search logs that identifies for, each of multiple queries, a user that sent the query, a time at which the user sent the query, and a location from which the user sent the query. The process further identifies candidate queries that are related to the query input based at least in part on: calculating a similarity between the users from the query-user graph based at least in part on similarities between the queries, the times at which the users submitted the queries, and the locations from which the users submitted the queries. The process further identifies the candidate queries by calculating a relatedness of each of the candidate queries to the received query input based at least in part on: (i) a difference between the current time associated with the received query input and a time when the candidate query was submitted, and (ii) a distance between the current location associated with the received query input and the location where the candidate query was sent.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes integrating time and location information associated with a query input to improve mobile query suggestions. For instance, a time-location awareness (TLA) application may operate as a mobile search engine to provide related query suggestions that are recommendations for a user to conduct further searches. Typical methods of measuring a distance between similar queries include: using keywords or phrases of query, matching a keyword between queries, associating commonly clicked uniform resource locators (URLs) with queries, or calculating a similarity between clicked documents associated with queries. The TLA application further categorizes these methods into two types, content-based methods and link-based measures. Content-based methods suggest queries based on string matching or semantic similarity. Link-based measures suggest related queries by exploiting links between query nodes, without considering content and semantic information of the queries. The TLA application applies link-based measures in the following discussion.

The TLA application provides mobile query suggestions in response to a query input that is time and location sensitive. For instance, envision that a user submits a query for "restaurants" at approximately five pm while near Wall Street in New York City (NYC). The TLA application captures the as input characteristics of the time that the user submitted the query (here, around dinner time) and a location of a mobile computing device when the user submitted the query (herein near the Wall Street area of NYC). The TLA application may then take this captured time and location into account when providing query suggestions to the user. The TLA application provides query suggestions as ranked items of related queries in a descending order in some instances. For instance, the TLA application may provide top-related queries "Delmonico's" (a historic eatery located near Wall Street), "Bayard's" (a French restaurant located close to Wall Street), "Harry's Café and Steak" (a steak restaurant near Wall Street), and other restaurants around the Wall Street area in NYC. Thus, the TLA application provides mobile query suggestions based on at least three inputs: the query input, the time of the query input (e.g., dinner time, etc.), and the current location of a mobile computing device used to submit the query input (e.g., close to Wall Street in NYC, etc.).

Initially, the TLA application receives or collects mobile search logs from users who have given permission for their data to be collected. The TLA application builds a query-user graph (e.g., a bipartite graph) to extract users that submitted queries from the mobile search logs. This information may be referred to as the query issuing history, which captures queries that have been submitted by the users to identify query patterns that are sensitive to time and location. The TLA application associates time (e.g., when) and location (e.g., where) information with the submitted queries. The current location refers to a location of the computing device of the user that submits the query.

The TLA application further computes similarities between two users based on their query issuing history. The TLA application may apply a TLA transition to the query-user graph. The TLA transition is a Markov transition process that calculates a probability going from a first node to a second node by considering outgoing neighbors during the transition.

The TLA application further applies a relatedness measurement to identify related queries for the mobile query suggestions. Traditional query suggestion methods measure relatedness between two queries by their common users or URLs. However, the TLA application determines if candidate queries are related to the query input, when the candidate queries and the query input are submitted (e.g., issued) by many similar users at about similar times and at about similar locations. The TLA application applies the link-based measure to capture this information by measuring the relatedness between the candidate queries and the query input based on their issued history and user groups. The TLA application produce results by further exploiting the time and location information associated with the links. Furthermore, the TLA application calculates distances of times and locations of the candidate queries and of the query input currently being submitted, and of the candidate queries and of the query input that have been submitted.

The mobile query suggestions integrating time and location information may be used in search engines and websites. In some implementations, the mobile query suggestions may be presented in a drop-down list in an Internet browser, a website, local databases, or local operating systems.

While aspects of described techniques can be implemented in any number of different computing systems, environments, and/or configurations, implementations are described in the context of the following example computing environment.

Illustrative Environment

Figure 1:
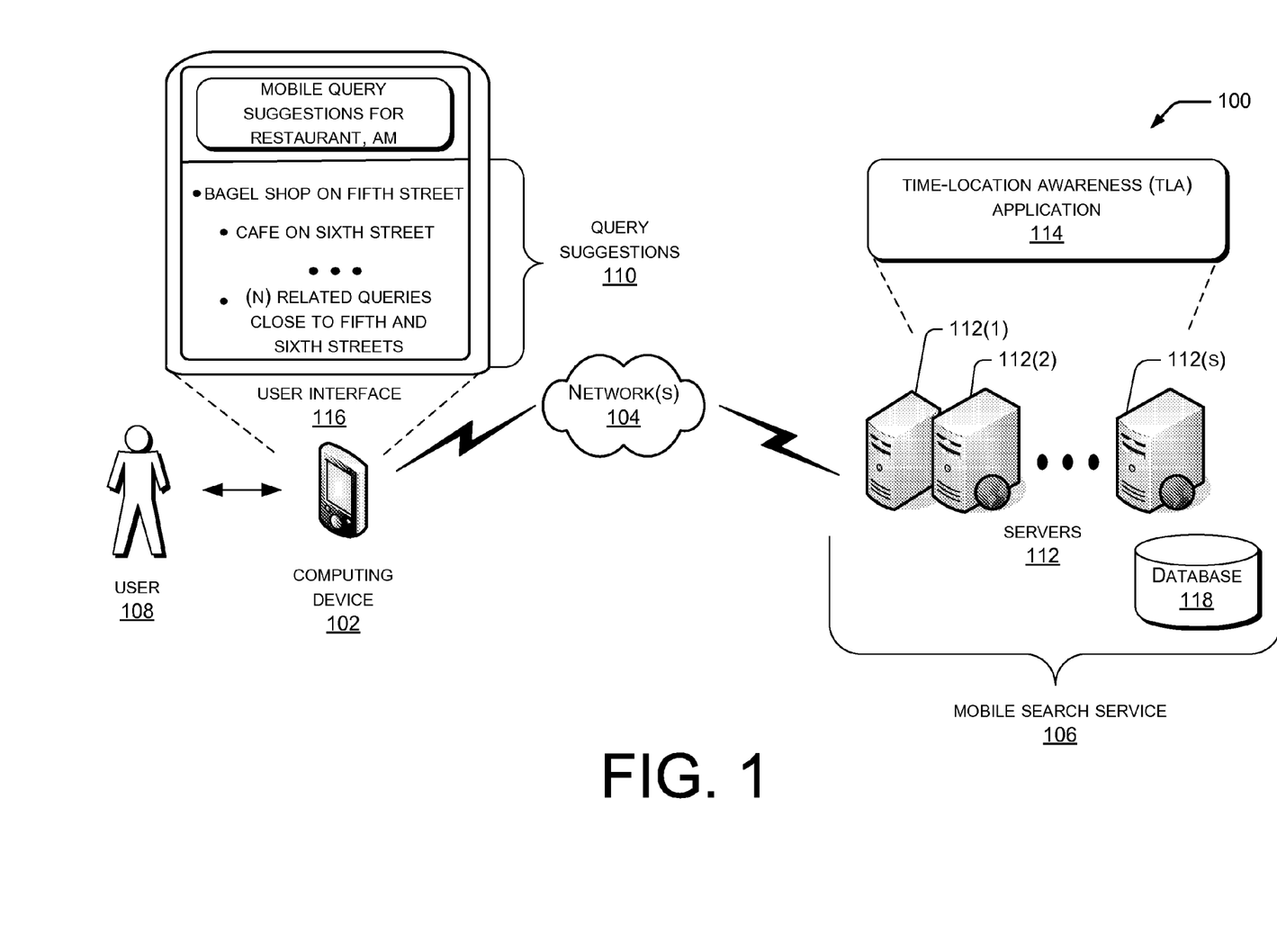
FIG. 1 shows an illustrative architectural environment for integrating time and location information into mobile query suggestions in response to a query input.

FIG. 1 illustrates an example architectural environment 100, which provides mobile query suggestions by integrating time and location information into the suggestions. The architectural environment 100 includes an example computing device 102, which is illustrated as a mobile computing device. The computing device 102 is configured to connect via one or more network(s) 104 to access a mobile search service 106 for a user 108.

The computing device 102 may take a variety of forms, including, but not limited to, a portable handheld computing device (e.g., a personal digital assistant, a smart phone, a cellular phone), a personal navigation device, a laptop computer, a portable media player, or any other device capable of accessing the mobile search service 106.

The network(s) 104 represents any type of communications network(s), including wire-based networks (e.g., public switched telephone, cable, and data networks) and wireless networks (e.g., cellular, satellite, WiFi, and Bluetooth).

The mobile search service 106 represents an application service that may be operated as part of any number of online service providers, such as a search engine, a social networking site, or the like. The user 108 inputs query text on the computing device 102. The mobile search service 106 may recommend mobile query suggestions 110 in "real-time," which is defined as producing suggestions substantially at the same time as receiving the input. In an implementation, the mobile search service 106 may provide the mobile query suggestions 110 after completion of the query input. In addition, the mobile search service 106 may include additional modules or may work in conjunction with modules to perform the operations discussed below.

In the illustrated example, the mobile search service 106 is hosted on one or more servers, such as server 112(1), 112(2), . . . , 112(S), accessible via the network(s) 104. The servers 112(1)-(S) may be configured as plural independent servers, or as a collection of servers that are configured to perform processing functions for mobile query suggestions. The servers 112(1)-(S) may be administered or hosted by a network service provider that provides the mobile search service 106 to and from the computing device 102.

The mobile search service 106 may be executed on the one or more of the servers 112(1)-(S) running a time-location awareness (TLA) application 114. The TLA application 114 utilizes the query input, the time of the query input, and a current location of the computing device 102 associated with the user 108 to suggest dynamically changing query results.

In the illustrated example, the computing device 102 may include a user interface (UI) 116 that is presented on a display of the computing device 102. The UI 116 facilitates access to the mobile search service 106 providing real-time networked communication systems. In one implementation, the UI 116 is a browser-based UI that presents a page received from the TLA application 114. For example, the user 108 employs the UI 116 to submit a request for mobile query suggestions 110 from the mobile search service 106. For example, the UI 116 may allow for different types of input, such as text or speech. Furthermore, while the architecture 100 illustrates the TLA application 114 as a network-accessible application, in other instances the computing device 102 may host the TLA application 114.

In the illustration, the user 108 accesses the mobile search service 106 or the TLA application 114 via the network 104 using their computing device 102. The mobile search service 106 presents the user interface (UI) 116 to receive a query input (e.g., "restaurant"). The mobile search servicer 106 then associates a current time of the query input (e.g., morning, afternoon, etc.) and a current location of the computing device 102 (e.g., in Wichita, Kans., in Vancouver, Wash., etc.). The mobile search service 106 then provides mobile query suggestions 110 based on related queries as determined by the bipartite graph, similarity calculations, and relatedness measurements. Each of these functionalities will be discussed in more details.

In the illustrated example, the user 108 submits a query "restaurant" sometime in the morning while near Fifth Street in Vancouver. In response, the TLA application 114 of the mobile search service 106 generates one or more query suggestions 110 based at least in part on the query, the time that the user 108 submits the query, and the location of the mobile device 102 (and, hence, the user 108) when the user 108 submits the query. In this example, the mobile search service 106 generates the query suggestions 110 of "bagel spot" (a restaurant on Fifth Street in Vancouver), "café" (a restaurant on Sixth Street in Vancouver) and "N" other related queries that may include other restaurants that are close to Fifth and Sixth Streets.

As illustrated, the environment 100 may include a database 118, which may be stored on a separate server or on the representative set of servers 112 that is accessible via the network(s) 104. The database 118 may store mobile query search suggestions 110 generated by the TLA application 114. Furthermore, the database 118 may host the mobile search logs of users to be used for constructing bipartite graphs, calculating similarities between users, and computing relatedness of candidate queries to the query input, each of which are discussed in detail below.

Illustrative Processes

FIGS. 2-3 and 6-7 are flowcharts showing example processes. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible for one or more of the provided steps to be omitted.

Figure 2:
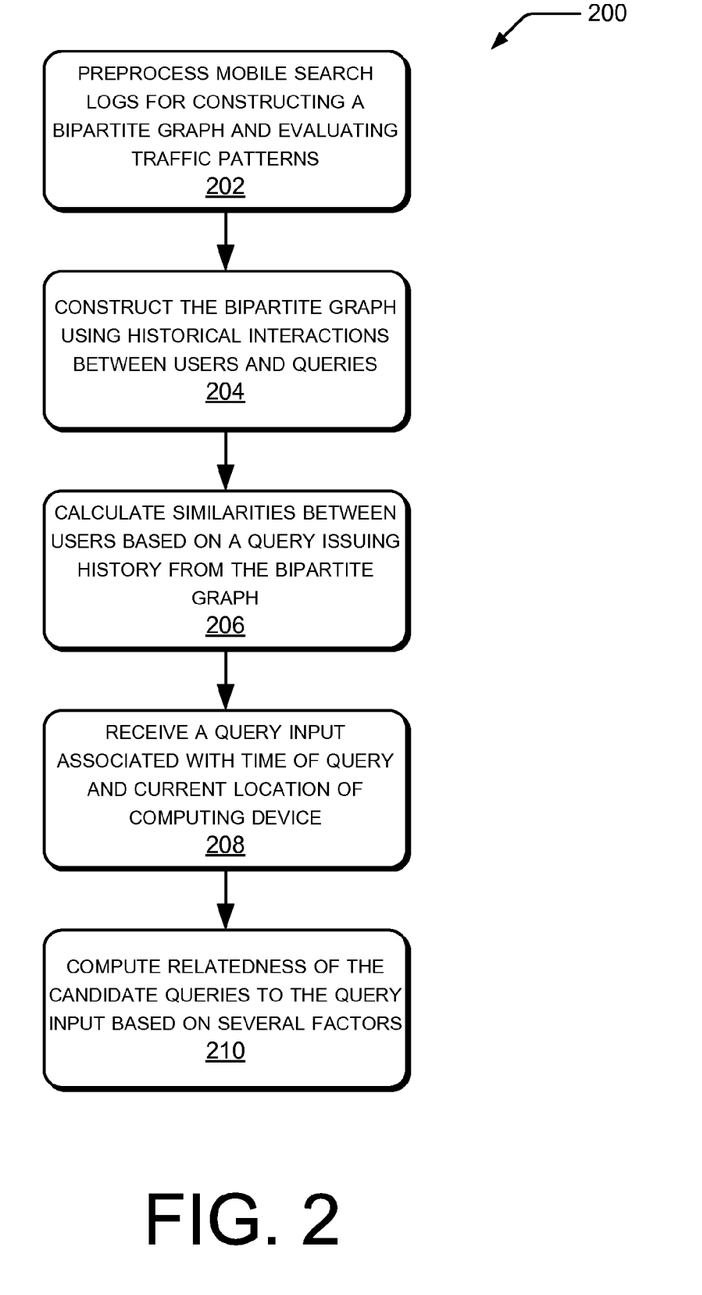
FIG. 2 is a flowchart showing illustrative high-level phases for providing the mobile query suggestions for use by the architecture of FIG. 1.

FIG. 2 is a flowchart showing an example process 200 of high-level functions performed by the mobile search service 106 and/or the TLA application 114. The process 200 may be divided into five phases: an initial phase to preprocess mobile search logs for constructing a bipartite graph 202, a second phase to construct the bipartite graph using historical interactions between users and queries 204, a third phase to calculate similarities between users based on a query issuing history from the bipartite graph 206, a fourth phase to receive a query input associated with a time of the query input and a current location of the computing device 208, and a fifth phase to compute relatedness of the candidate queries to the query input based on several factors 210. All of the phases may be used in the environment of FIG. 1, may be performed separately or in combination, and without any particular order.

The first phase is to preprocess mobile search logs for constructing a bipartite graph 202. Here, the TLA application 114 collects or receives mobile search logs that include data of individual users, queries, and time and location information associated with the queries.

The second phase involves constructing the bipartite graph using historical interactions between queries and users 204. The TLA application 114 builds the bipartite graph by extracting users that submitted queries from the mobile search logs. The TLA application 114 then formalizes the mobile search logs, where each record of the mobile search logs is represented as a quadruple entry (query, user, time, location) in some instances. The bipartite graph organizes a user (e.g., shown as a vertex) that issued or submitted a query (e.g., shown as another vertex) with time and location information corresponding to an edge between the user and the query.

The third phase is to calculate similarities between the users based on query issuing history from the bipartite graph 206. The TLA application 114 calculates the similarities between the users having issued similar queries at about similar times and at about similar locations.

The fourth phase is to receive a query input associated with a time of the query input and a current location of computing device 208. The query input may be provided via text or speech. The user 108 is interested in seeking information that pertains to his or her current time and current location.

The fifth phase is to compute relatedness of the candidate queries to the query input based on several factors 210. The TLA application 114 determines if the candidate queries are related to the query input if both are issued by many similar users at about similar times and at about similar locations. The TLA application 114 applies the link-based method to capture this information by measuring the relatedness between queries based on their issued history and user groups.

Figure 3:
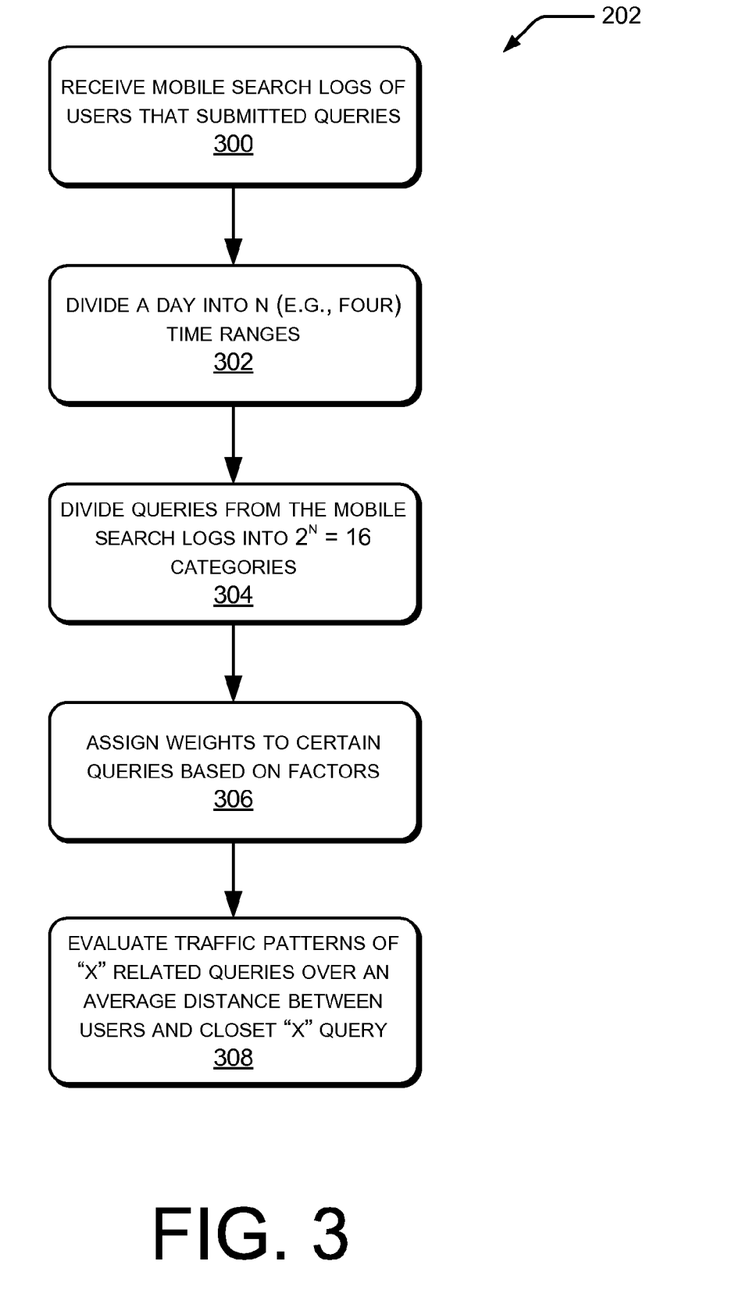
FIG. 3 is a flowchart showing an illustrative process of preprocessing mobile search logs for constructing a bipartite graph and evaluating traffic patterns.

FIG. 3 is a flowchart showing an illustrative process of preprocessing mobile search logs for constructing a bipartite graph 202 (discussed at a high-level above). This information identifies the time and location sensitive aspects of queries.

The TLA application 114 receives mobile search logs of users that submitted queries 300. The mobile search logs may be obtained from a global positioning system (GPS) tracking unit to identify a location or to track a movement of a vehicle or a person when the vehicle or the person is in close proximity to a GPS device. For example, the location or movement is recorded via GPS devices or mobile computing devices with GPS functionalities. The increasing popularity of location-acquisition technologies and their use in people's lives results in GPS information being collected daily. The mobile search logs collection includes time represented in an hour and minutes and location represented by GPS coordinates of longitude and latitude pair.

Each of the individual users is asked prior to tracking or sharing their movements and locations if their GPS data may be included as a part of the mobile search logs collection. The options are that the individual user may choose to opt-in to participate or to opt-out to not participate in their tracking or sharing of GPS data. As such, the tracking of the GPS data may require explicit user consent.

The TLA application 114 preprocesses the mobile search logs by removing certain types of queries (e.g., containing objectionable content) and queries without time and location information recorded. The TLA application 114 may further process query words using a Porter Stemming algorithm. The mobile search logs may include over one million unique queries and over one and a half million users.

The TLA application 114 divides a day into any number "N" time ranges 302. In one example, the TLA application 114 divides a day into the following four time ranges: morning from 6 am until 12 noon, afternoon from 12 noon until 6 pm, evening from 6 pm until 12 midnight, and night from 12 midnight until 6 am.

The TLA application 114 further divides the queries from the mobile search logs into $2^N$ categories 304 (e.g., $2^4=16$ categories). The TLA application 114 names each category by a 4-bit binary code, such as "0101" where "1" refers to a frequency of the query issued or submitted in a corresponding time range. The "1" is considered to be a higher frequency than an average frequency issued or submitted. The TLA application 114 identifies four typical category codes with a single "1" and their popular queries, which are shown in Table I. below.

TABLE I

Example Query Categories and Popular Queries

| Category Code | Popular Query Contents |
| --- | --- |
| 1000 (night) | Entertainment, morning journals, breakfast |
| 0100 (morning) | Investment information |
| 0010 (afternoon) | Steak house, seafood, pizza |
| 0001 (evening) | TV show, entertainment, 24-hour convenience store |

Table I. indicates that the queries dynamically change with time. Different time ranges may have different popular queries. For example, investment information may be a very popular activity in the morning.

The TLA application 114 assigns weights to certain queries based on factors 306. By way of example and not limitation, the weighted factors of the queries may include a submit frequency of the query, a type of query, and a time of submitting the query. The weights may be preconfigured by the mobile search service 106 or the TLA application 114 or upon execution of the service, and/or refined based on frequency of query by multiple users.

The TLA application 114 evaluates traffic patterns of "X" related queries over an average distance between users and closest "X" query 308.

Figure 4:
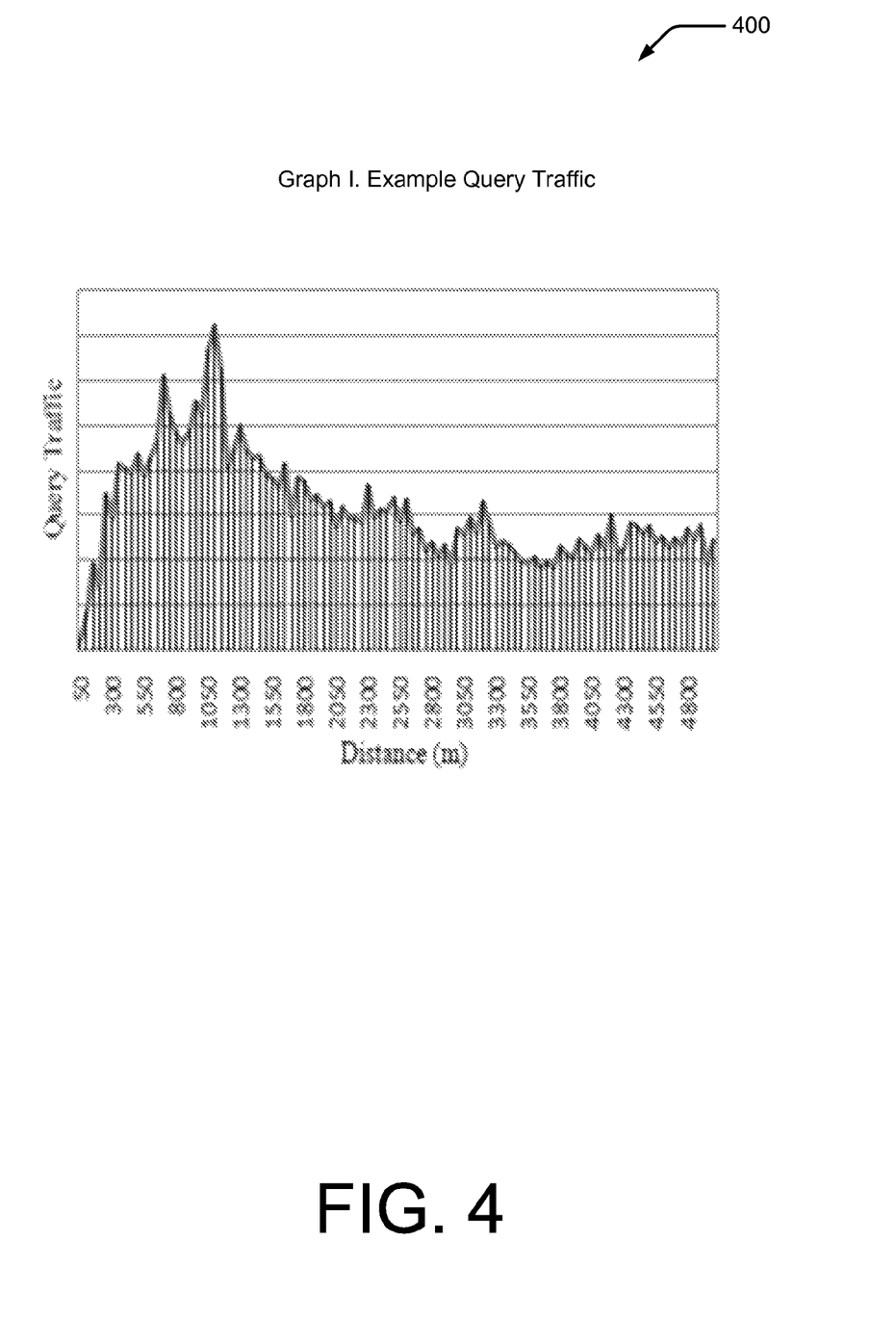
FIG. 4 illustrates an example graph of a plot of query traffic patterns.

FIG. 4 illustrates an example graph of a plot of query traffic patterns. For example, for a query of "restaurant," the TLA application 114 plots the information in Graph I. The graph shows the traffic pattern of "restaurant" related queries over an average distance between users and a restaurant visited that is closest to the computing device 102 of the user 108.

Shown on a y-axis is query traffic and on an x-axis is a distance (e.g., average distance) measured in meters between computing devices 102 of the users that submitted the queries and the restaurant that is visited by the users. The mobile search logs indicate that the query content of the restaurant tends to be close in distance to the location of the computing device 102 of the user 108. The majority of the traffic of "restaurant" related queries occurs at restaurants less than 1550 meters from where the query was submitted to the mobile search engine 106 in this example.

Figure 5:
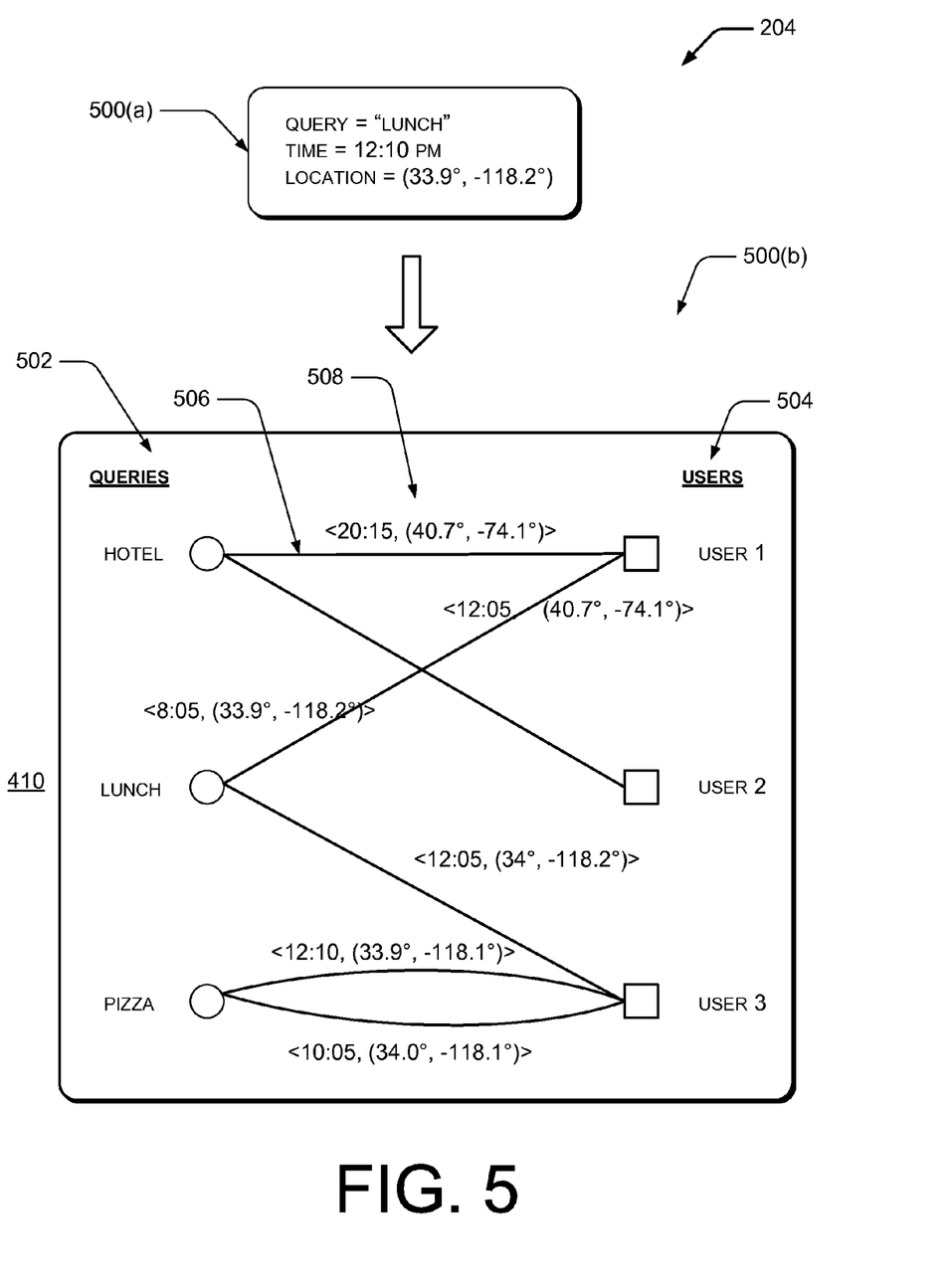
FIG. 5 shows an illustrative query-user graph that records historical interactions between queries and users.

FIG. 5 illustrates an example process of constructing a bipartite graph that records historical interactions between queries and users 204 (discussed at a high-level above).

The TLA application 114 extracts the users that submitted queries information from the mobile search logs of individual users. The logs generally may be a collection of GPS points, which include a time, a longitude and a latitude pair. For example, shown at 500(a) is a query input of lunch, a time displayed at 12:10 pm, and a location of (33.9°, −118.2°).

The TLA application 114 constructs the bipartite graph 500(b), which may be represented by G (Q, U, T, L), where Q, U, T, L are sets of queries, users, times, and locations, respectively. The TLA application 114 divides vertices of the bipartite graph 500(b) into two disjoint sets, queries 502 and users 504. For instance, the bipartite graph 500(b) formalizes the mobile search logs by representing each record with a quadruple entry <query, user, time, location>. For instance, the entry may be $user_1$ submits $query_1$ at $time_1$ and at $location_1$. The entry for this information may be represented as <$q_i$, $u_j$, $t_i$, $l_j$> and corresponds to an edge in the query-user graph. The edge may be located between $q_i$ and $u_j$ in the query-user graph with <$t_i$, $l_j$> to be the time and location associated with this edge.

In an implementation, the vertices or nodes, such as the queries 502 and the users 504, represent fundamental units of the bipartite graph 500(b) and are independent sets. An edge 506 connects a vertex in users 504 (e.g., user 1) to a vertex in queries 502 (e.g., hotel). The bipartite graph 500(b) associates the time and the location with each edge when the user 1 submits the query of hotel. Shown at 502 are the queries of hotel, lunch, and pizza and at 504 are the users of user 1, user 2, and user 3.

The TLA application 114 uses a Markov transition process following edges with time and location information associated with them. The time and location information may be represented by distribution vectors, T and L, between the queries 502 and the users 504. The time and location information is associated with each edge shown in the bipartite graph, also referred to as a user-query graph. The bipartite graph 500(b) further shows the coordinates of the locations associated with the edge 506 at 508. For example, the edge shows information for time, and longitude and latitude pair <20:15, (40.7°, −74.1°)> at 508.

The TLA application 114 measures a random walk process based on a time and a location transition on the query-user graph by calculating a probability. The TLA application 114 calculates the probability from a first node to a second node, to be decided by the first node's outgoing neighbors. The TLA application 114 further calculates the probability from a distance between a current time and a current location and the time and the location associated with an edge connecting the first node and the second node.

For instance, the bipartite graph 500(b) illustrates the probability of going from a vertex of queries to a vertex of users. Turning to 510, the probability of going from the vertex of lunch to the vertex of user 3 is higher than the probability of going from the vertex of lunch to the vertex of user 2. The distance from travelling from lunch to user 3 is shorter than the distance travelling from lunch to user 2. Thus, the TLA application 114 attributes the higher probability due to a shorter distance in issuing time and locations.

The TLA application 114 assumes at time t and at location l, a query q waits for suggestions. For instance, the TLA application 114 uses the bipartite graph of G (Q, U, T, L), receives the input of <q, t, l>, and returns the output in a descending ranked list of related queries ($q_1$, $q_2$, $q_3$, $q_k$) according to the relatedness of the candidate queries $q_i$ to the query input q, where $1 \leq i \leq k$ and $k \geq 1$.

Figure 6:
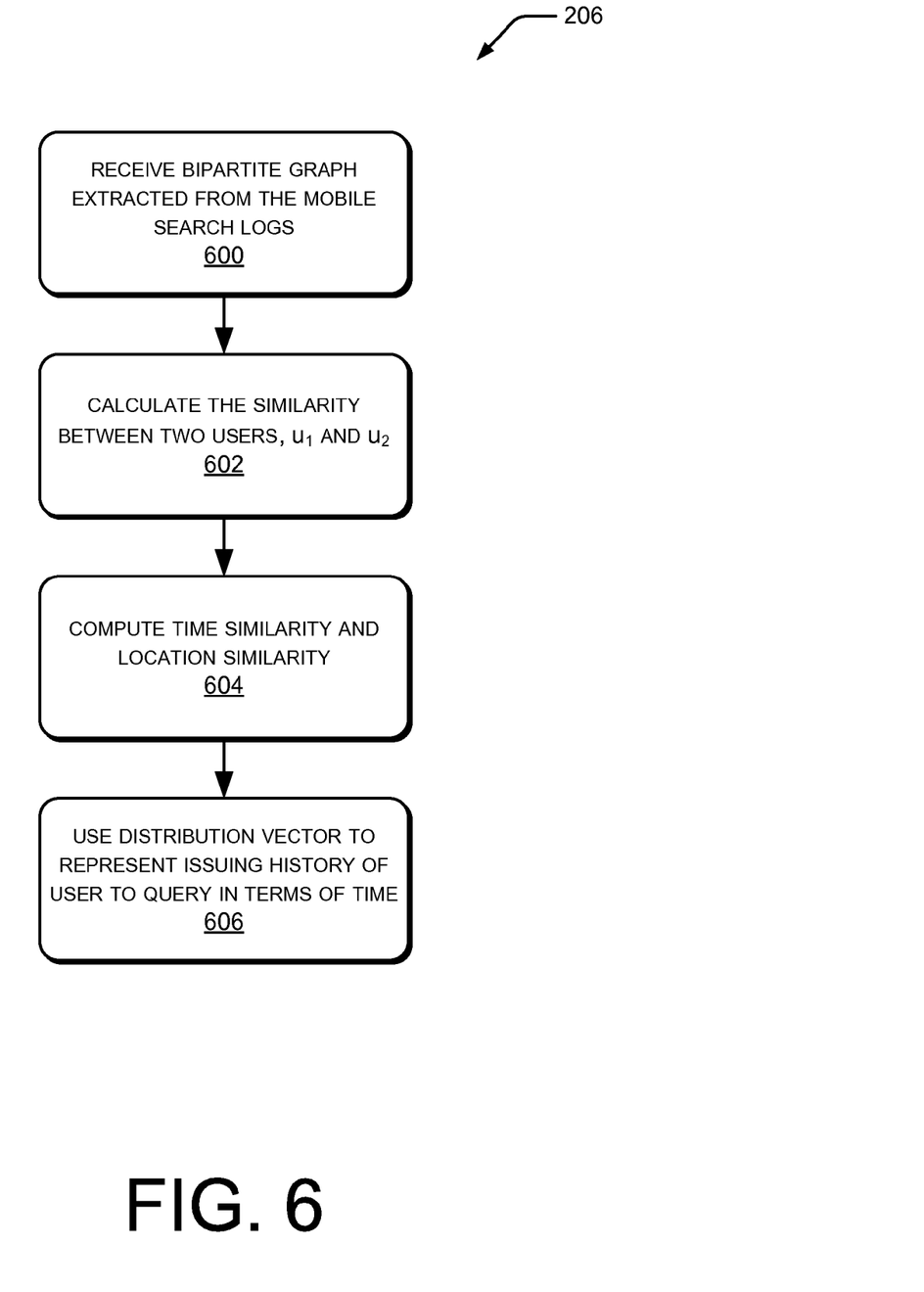
FIG. 6 is a flowchart showing an illustrative process of calculating similarities between users based on query issuing history.

FIG. 6 is a flowchart showing an illustrative process of calculating similarities between users based on query issuing history from the bipartite graph 206 (discussed at a high-level above). The TLA application 114 receives the bipartite graph extracted from the mobile search logs 600.

Using the query issuing history data of users, the TLA application 114 calculates the similarity between two users $u_1$ and $u_2$ 602 by using the equation below:

$$\text{Sim\_user}(u_1, u_2) = \frac{\sum_{q_i \in |Q(u_1) \cap Q(u_2)|} S(u_1, u_2, q_i)}{|Q(u_1)||Q(u_2)|}$$

where $Q(u_1)$, $Q(u_2)$ represent a set of queries that are issued by each user, $u_1$, $u_2$, and $|Q(u)|$ represents a size of the set. The terms $Q(u_1) \cap Q(u_2)$ represent an intersection of common queries that $u_1$ and $u_2$ each have submitted to a search engine or to the mobile search service 106. A larger Sim_user($u_1$, $u_2$) value indicates there is more similarity among the two users $u_1$ and $u_2$. As mentioned, if the two users issued similar queries at about similar times and at about similar locations, the two users should be similar.

The TLA application 114 measures a similarity between two users, $u_1$ and $u_2$ based on their issuing histories, times, and locations associated with query $q_i$. The term $S(u_1, u_2, q_i)$ may be written as:

$$S(u_1, u_2, q_i) = T(u_1, u_2, q_i) \cdot L(u_1, u_2, q_i).$$

The TLA application 114 computes a time similarity T and a location similarity L 604. The TLA application 114 may further customize the functions of T and L based on a problem of interest.

For instance, the TLA application 114 may want to evaluate the hours at which a query is issued in a day. The TLA application 114 may use a distribution vector to represent the issuing history of user u to query q in terms of time 606. In particular, the distribution vector may include a 24-dimension vector to represent the time. This may be represented as:

$$\vec{t}_{u,q} = <t_1, t_2, \ldots, t_{24}>.$$

In an implementation, an element such as $t_1$ may be from 12 am to 1 pm. The element in the vector represents a count that query q is issued (e.g., submitted) in that hour by user u. Based on this information, $T(u_1, u_2, q_i)$ may be defined as:

$$T(u_1, u_2, q_i) = \text{similarity of } \vec{t}_{u_1, q_i} \text{ and } \vec{t}_{u_2, q_i}.$$

This illustrates an implementation of representing the time with vectors.

The TLA application 114 may use different methods to compute a distance of two vectors. In an implementation, the TLA application 114 may use a cosine similarity method to compute the distance for $T(u_1, u_2, q_i)$. In yet another implementation, the TLA application 114 may use a distance function equation to be discussed with reference to FIG. 7.

Figure 7:
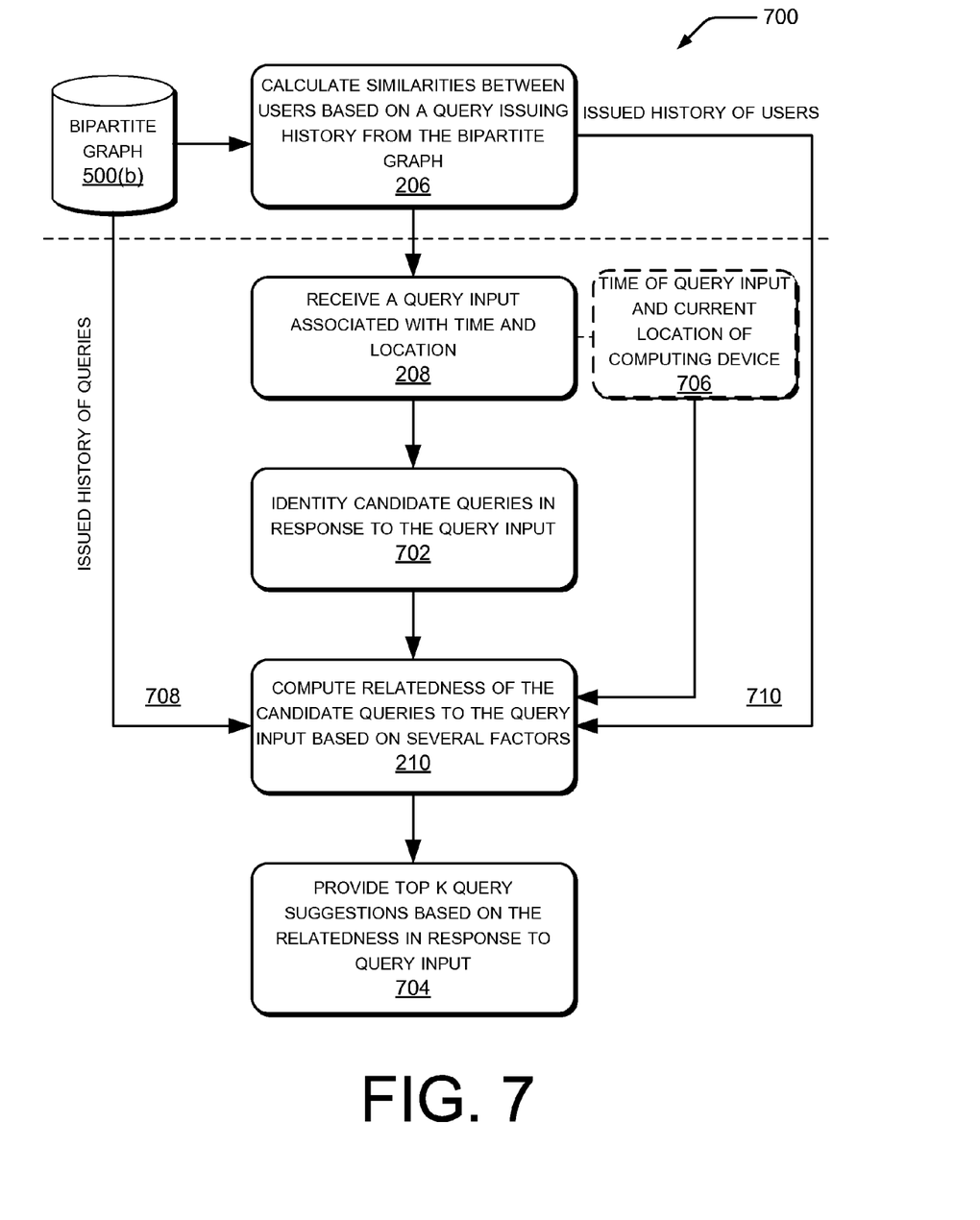
FIG. 7 is a flowchart showing an illustrative process of computing relatedness and recommending mobile query suggestions.

FIG. 7 is a flowchart showing an illustrative process 700 of the TLA application 114 providing the top mobile query suggestions based on the relatedness in response to a query input. The process 700 may be divided into two processes: an offline process and an online process. The offline process includes two sub-parts of constructing the bipartite graph 500(b) and of calculating the similarities between the users 206, shown above a dotted line for the offline process. The online process includes four sub-parts of receiving the query input 208, identifying candidate queries 702, computing relatedness 210, and providing top query suggestions 704.

The TLA application 114 constructs the bipartite graph 500(b) to extract the users who submitted queries information from the mobile search logs. The time and location information are associated with the users who submitted the queries. This was previously discussed with reference to FIG. 5.

At 206, the TLA application 114 calculates the similarities between the users based on the query issuing history from the bipartite graph 500(b). This was previously discussed with reference to FIG. 6.

At 208, the TLA application 114 receives a query input associated with a time of the query and a current location of the computing device 102. The input includes <q, t, l>, as discussed with reference to FIG. 5.

The TLA application 114 identifies the candidate queries in response to the query input 702. The TLA application 114 identifies the candidate queries based on assuming the candidate queries and the query input that have been issued (e.g., submitted) by a same user are related. In an implementation, the TLA application 114 identifies a number of candidate queries based on the candidate queries sharing common users with the query input.

At 210, the TLA application 114 computes the relatedness of the candidate queries to the query input based on several factors. The several factors include but are not limited to: (1) the similarity of the user groups having submitted candidate queries and the query input, (2) distances between the times and the locations at which the users are issuing and have issued the query input and the candidate queries, and (3) a current time and a current location of the computing device 102. For instance, the distance between the times may be described as a distance between a submitting time (e.g., current time of sending query input) and a submitted time (e.g., time the user previously issued the query input) of the query input. This distance between times is also computed for a submitting time (e.g., current time of sending candidate query) and a submitted time (e.g., time the user previously issued the candidate query) of each of the candidate queries. The distance between the locations may be described as a distance between a submitting location (e.g., current location of the computing device sending the query) and a submitted location (e.g., location of computing device when the query was issued) of the query input and of each of the candidate queries.

Turning to 210, the inputs to compute the relatedness include the query input 208, with the time of the query input being submitted and the current location of computing device 706, which are shown in dotted box to indicate these factors are integrated. Other inputs to 210 include the identified candidate queries 702, the issued history of queries from the bipartite graph shown as 708, and the similarities of the user groups from 206, which is shown as 710.

The following equation computes the relatedness of the candidate query q' to the query input q at a time and a location:

$$\text{Sim\_query}(q, q', t, l) = $$

$$\frac{\sum_{u_i \in U_q} \sum_{u_j \in U_{q'}} \begin{pmatrix} P(q, u_i, t, l) \cdot P(q', u_j, t, l) \cdot \\ \text{Sim\_user}(u_i, u_j) \end{pmatrix}}{|U(q) \cup U(q')|}$$

where U(q), U(q') represent a set of users who ever submitted the query input and the candidate query, respectively. The terms |U(q)∪U(q')| represent a size of a union of q's user group and q's user group.

Proximity (P) is a transition probability of a random surfer following an edge (a,b) with respect to the submitting time and location (t,l). For instance, P(q, u, t, l) may represent a weight of a user u in relation to distances between the times and the locations at which he or she has submitted a query input and a specific time and location pair, t and l. The value of P (q, u, t, l) may be a relatively large number if the user u often submitted the query input at a time close to t and at a location close to l. The following equation may be used to compute P:

$$P(q, u, t, l) = \sum_{t_i} \text{Dis\_time}(t, t_i) \frac{\text{Frequency of } u \text{ issued } q \text{ at time } t_i}{\text{Frequency of } u \text{ issued } q}$$

$$\sum_{l_i} \text{Dis\_location}(l, l_i) \frac{\text{Frequency of } u \text{ issued } q \text{ at location } l_i}{\text{Frequency of } u \text{ issued } q}$$

where $t_i$ and $l_i$ represents a time and a location at which the user u previously issued the query input q. Dis_time(t, $t_i$) and Dis_location(l, $l_i$) measures distances between two times and measures distances between two locations, respectively. As mentioned, the times are current time t (e.g., submitting time) of the query input and submitted time $t_i$ (e.g., issued time) of the query input. The locations are a current submitting location l of the computing device used to submit the query input and the submitted location $l_i$ (e.g., location issued) of the computing device used to submit the query input previously. A larger distance value indicates the two times or the two locations are closer.

The TLA application 114 further computes P(q',$u_j$, t, l) for the candidate query q'. As described above, the TLA application 114 further measures distances between the two times and the two locations of the candidate query in a similar manner for the query input.

As mentioned previously, the TLA application 114 may customize the T and L functions based on the problem of interest. The following equation may be used to compute the distance between the two times ($t_1$, $t_2$):

$$\text{Dis\_time}(t_1, t_2) = \begin{cases} 1, & \text{if the time period between } t_1 \text{ and } t_2 \text{ less than 60 minutes} \\ \frac{0.5 + 60}{\text{the interval minutes between } t_1 \text{ and } t_2} + 0.5, & \text{otherwise.} \end{cases}$$

Next, the process 700 provides top k query suggestions based on the relatedness in response to the query input 704. The TLA application 114 identifies or selects the top candidate queries and ranks them according to their relatedness relative to the query input <q, t, l>. Thus, the TLA application 114 identifies the top ranked candidate queries as the most related queries in a descending order. The output is a descending ranked list of the related queries <$q_1, q_2, q_3, \ldots q_i$,> based on the relatedness between the query input and the candidate queries.

Figure 8:
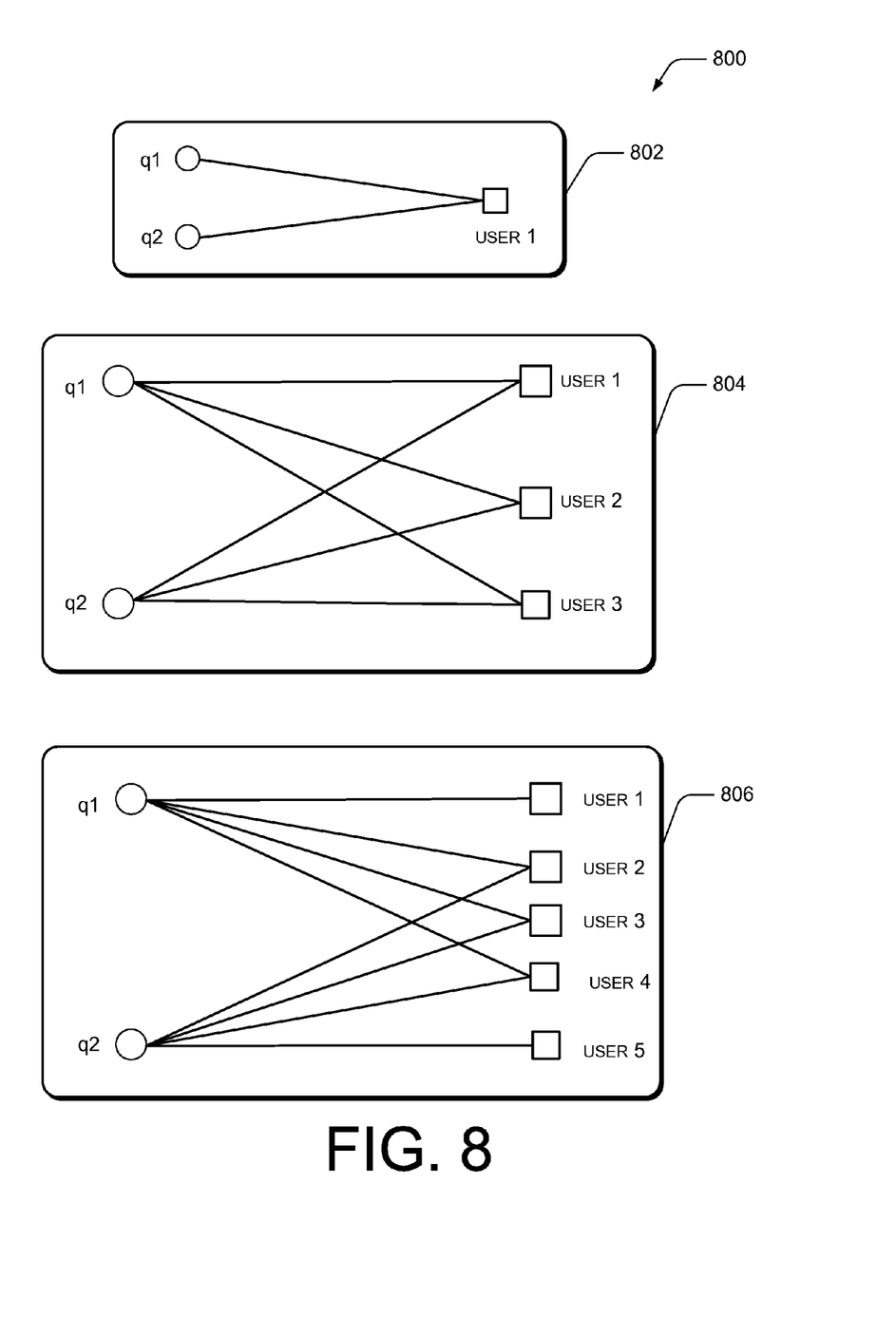
FIG. 8 shows illustrative bipartite graphs of determining the relatedness between the query and candidate query.

FIG. 8 shows example bipartite graphs 800 to illustrate computation of the relatedness between the queries according to their users. The TLA application 114 assumes that the queries are highly related if there are many common users as possible and as few uncommon users as possible.

At 802, the bipartite graph illustrates there is one user, user 1, who submitted two queries, q1, and q2. The bipartite graph 802 illustrates there are no uncommon users but only one (very few) common user, so there is no relatedness of the queries according to the users.

At 804, the bipartite graph illustrates user 1 submitted queries q1 and q2; user 2 submitted queries q1 and q2; and user 3 submitted queries q1 and q2. The bipartite graph 802 illustrates there are many common users as possible and no uncommon user.

At 806, the bipartite graph 806 illustrates user 1 submitted query q1; user 2 submitted queries q1 and q2; user 3 submitted queries q1 and q2; user 4 submitted queries q1 and q2; and user 5 submitted query q2. The bipartite graph 806 illustrates there are common users, but not as many common user as there possibly could be and there are more uncommon users than possible, user 1 and user 5.

Based on the assumption that the queries are highly related if there are many common users as possible and as few uncommon users as possible, the bipartite graph 804 illustrates the queries are highly related based on compactness of the user groups.

Example Server

Figure 9:
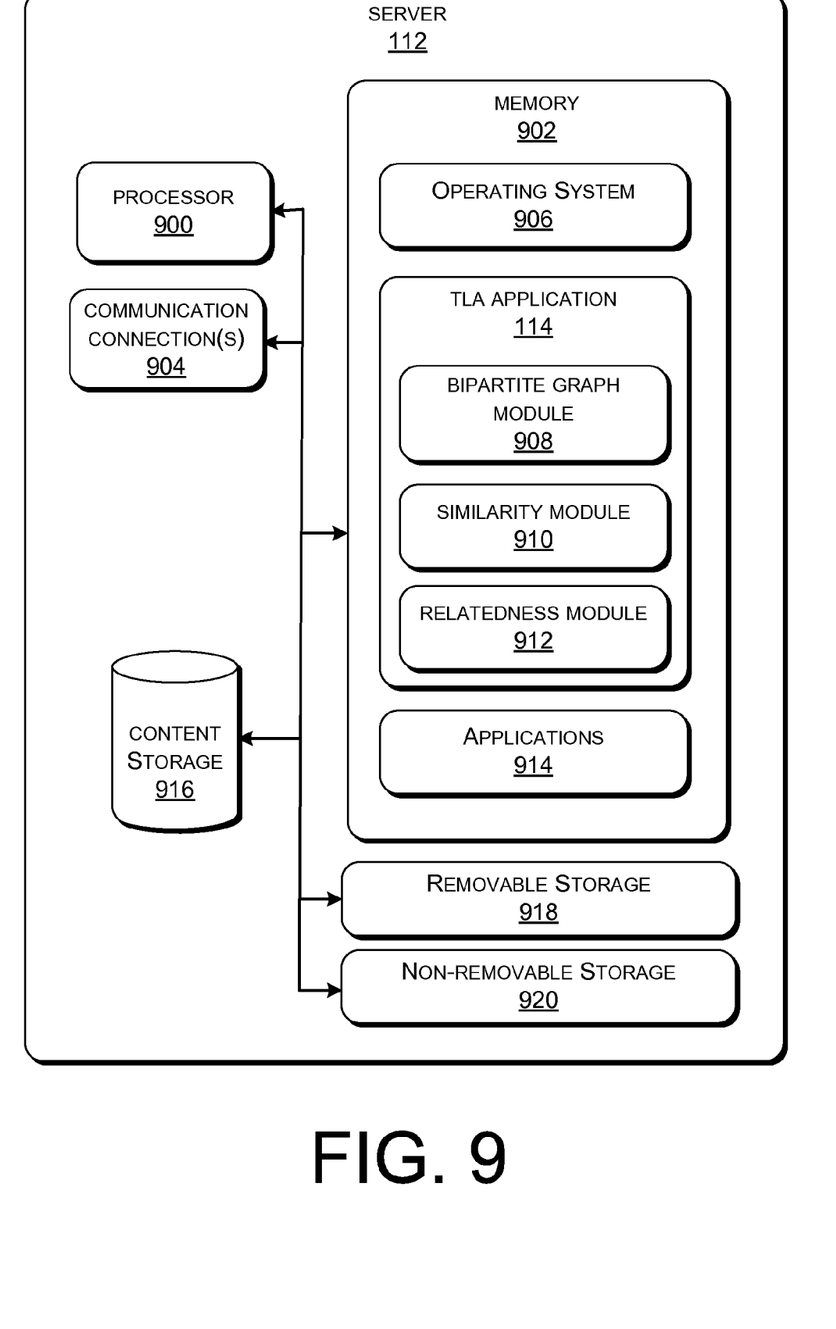
FIG. 9 is a block diagram showing an illustrative server usable with the architecture of FIG. 1.

FIG. 9 is a block diagram showing an example server usable with the environment of FIG. 1. The server 112 may be configured as any suitable system capable of services, which includes, but is not limited to, implementing the mobile search service 106 or the TLA application 114 for online services, such as providing mobile query suggestions that incorporates time and location information into the suggestions. In one example configuration, the server 112 comprises at least one processor 900, a memory 902, and a communication connection(s) 904. The communication connection(s) 904 may include access to a wide area network (WAN) module, a local area network module (e.g., WiFi), a personal area network module (e.g., Bluetooth), and/or any other suitable communication modules to allow the server 112 to communicate over the network(s) 104.

Turning to the contents of the memory 902 in more detail, the memory 902 may store an operating system 906, the TLA application 114 a bipartite graph module 908, a similarity module 910, a relatedness module 912, and one or more applications 914 for implementing all or a part of applications and/or services using the TLA application 114.

The bipartite graph module 908 constructs the bipartite graph based on the historical interactions between the queries and the users. The bipartite graph module 908 constructs the bipartite graph to represent issuing action of the user to the query. The bipartite graph module 908 includes collecting or receiving the mobile search logs, extracting the information from the log data, and identifying queries, users by associating time and location information with the queries.

The similarity module 910 receives the query issuing history data of users from the bipartite graph and calculates a similarity of two users using the equations that were discussed with reference to FIG. 5. The similarity module 910 measures similarity of users based on issuing history data, time and location information associated with the query. Furthermore, the similarity module 910 computes the time similarity and the location similarity.

The relatedness module 912 computes relatedness between the query input and the candidate queries based on several factors. The relatedness module 912 determines if the query input and the candidate queries are related based on both queries issued by many common users at about similar times and at about similar locations. The relatedness module 912 measures the relatedness between the queries based on their issued history and user groups.

The one or more other applications 914 or modules may include an email application, online services, a calendar application, a navigation module, a game, and the like.

The server 112 may include a content storage 916 to store the collection of mobile search logs, bipartite graphs, and the like. Alternatively, this information may be stored on the database 118.

The server 112 may also include additional removable storage 918 and/or non-removable storage 920. Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server 112 as described above may be implemented in various types of systems or networks. For example, the server 112 may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented at least partially by a processor, the method comprising:
   constructing a graph by extracting queries from mobile search logs and identifying users that sent the queries, times at which the users sent the queries, and locations from which the users sent the queries;
   calculating a similarity between the users from the graph based at least in part on similarities between the queries, the times at which the users submitted the queries, and the locations from which the users submitted the queries;
   receiving, from a mobile computing device of a particular user, a query input associated with a current time and with a current location of the mobile computing device; and
   at least partly in response to the receiving of the query input:
      identifying, from the graph, one or more queries previously submitted by users that have previously submitted the query input, the one or more other queries comprising candidate queries; and
      computing a relatedness of each of the candidate queries to the received query input based at least in part on: (1) a calculated similarity between a respective user that submitted the candidate query and the particular user, (2) a difference between the current time associated with the received query input and a time when the candidate query was submitted, and (3) a distance between the current location associated with the received query input and a location where the candidate query was submitted; and
   removing, from the mobile search logs, one or more submitted queries that are not associated with time and location information.

2. The method of claim 1, wherein the calculating of the similarities of the users comprises:
   using distribution vectors to represent the times of the queries submitted by a first user and a second user;
   representing the times of the queries submitted by the first user and the second user based on a 24-dimension vector as a count to identify an hour of a day; and
   applying a cosine similarity function to compute a distance of the distribution vectors representing the times of the queries submitted by the first user and the second user to identify an hour between the distribution vectors.

3. The method of claim 1, further comprising:
   ranking the candidate queries based at least in part on the computed relatedness of each of the candidate queries to the received query input; and
   suggesting at least a portion of the candidate queries based at least in part on the ranking.

4. The method of claim 1, further comprising:
   ranking the candidate queries based at least in part on the computed relatedness of each of the candidate queries to the received query input; and
   recommending at least a portion of the candidate queries based at least in part on the candidate queries and the received query input have many common users, both submitted the received query input about a same time, and both submitted the received query input at about a same location of mobile computing devices.

5. The method of claim 1, further comprising providing one or more of the candidate queries as query suggestions in a descending order that is based at least in part on the computed relatedness of each of the candidate queries to the query input.

6. The method of claim 1, wherein the computing the relatedness further comprises:
   computing a weight of for a user that previously submitted the received query input based at least in part on measuring distances between (1) a time and a location at which the user has previously submitted the received query input, and (2) the current time and the current location.

7. The method of claim 6, applying the computed weight to one or more candidate queries, wherein the computed weight is higher based at least in part on being relative close to the current time and to the current location.

8. One or more computer-readable storage media encoded with instructions that, when executed by a processor, perform acts comprising:
   receiving, from a mobile computing device of a particular user, a query input associated with a current time and with a current location of the mobile computing device; and
   at least partly in response to the receiving of the query input:
      accessing a query-user graph constructed from mobile search logs that identifies for, each of multiple queries, a user that sent the query, a time at which the user sent the query, and a location from which the user sent the query; and
      identifying candidate queries that are related to the query input based at least in part on: calculating a similarity between the users from the query-user graph based at least in part on similarities between the queries, the times at which the users submitted the queries, and the locations from which the users submitted the queries, and calculating a relatedness of each of the candidate queries to the received query input based at least in part on;
         a difference between the current time associated with the received query input and a time when the candidate query was submitted;
         a distance between the current location associated with the received query input and the location where the candidate query was sent;
         computing a weight of a user based at least in part on measuring distances between a time and a location at which the user has previously submitted the received query input and the current time and the current location; and
         applying the computed weight to one or more candidate queries.

9. The computer-readable storage media of claim 8, wherein the mobile search logs include, for at least a portion of the multiple queries, a location of where the query was submitted as global positioning system (GPS) coordinates in a longitude and a latitude pair.

10. The computer-readable storage media of claim 8, wherein the candidate queries comprise at least a portion of multiple queries previously submitted by users represented in the query-user graph that have previously submitted the received query input.

11. The computer-readable storage media of claim 8, wherein the calculating the similarity comprises:
    representing the times of queries submitted by a first user and a second user using 24-dimension vectors to identify an hour of a day; and
    applying a cosine similarity function to compute a distance of the 24-dimension vectors representing the times of the queries submitted by the first user and the second user to identify an hour between the 24-dimension vectors.

12. The computer-readable storage media of claim 8, further comprising serving a user interface for display on the mobile computing device, the user interface to access a service application that provides mobile query searches.

13. The computer-readable storage media of claim 8, further comprising ranking the candidate queries based at least in part on the calculated relatedness of each of the candidate queries to the received query input.

14. A system comprising:
    a memory;
    a processor coupled to the memory;
    a graph module stored in the memory and executable on the processor to;
       construct a graph from mobile search logs to identify queries from mobile search logs;
       identify, for each of the queries, a user that sent a query, a time at which the user sent the query, and a location from which the user sent the query, the graph representing:
          each of the users and the query sent by the user as two nodes; and
          the time at which the user sent the query and the location from which the user sent the query as an edge; and
       calculate distances between the current time and the current location and the times and the locations with the edges between the two nodes;
    a similarity module stored in the memory and executable on the processor to compute a similarity between the users from the graph based at least in part on similarities between: (1) the queries, (2) the times at which the users submitted the queries, and (3) the locations from which the users submitted the queries; and
    a time-location awareness application module stored in the memory and executable on the processor to receive, from a mobile computing device of a particular user, a query input associated with a current time and a current location of the mobile computing device.

15. The system of claim 14, further comprising:
    a relatedness module stored in the memory and executable on the processor to compute a relatedness of each of multiple candidate queries to the query input based at least in part on the calculated similarity between the users, calculating a difference between the current time associated with the received query input and a time when the candidate query was submitted, and calculating a distance between the current location associated with the received query input and a location where the candidate query was submitted.

16. The system of claim 14, wherein the edge represents an issuing action from the user when submitting the query.

17. The system of claim 14, wherein the similarity module is further executable on the processor to:
    represent times of queries submitted by a first user and a second user based on a 24-dimension distribution vector to identify an hour of a day; and
    apply a cosine similarity function to compute a distance of the 24-dimension distribution vectors representing the times of the queries submitted by the first user and the second user to identify an hour between the distribution vectors.

* * * * *

UNITED STATES PATENT AND TRADEMARK OFFICE
CERTIFICATE OF CORRECTION

PATENT NO. : 8,489,625 B2  
APPLICATION NO. : 12/955758  
DATED : July 16, 2013  
INVENTOR(S) : Ni et al.

Page 1 of 1

It is certified that error appears in the above-identified patent and that said Letters Patent is hereby corrected as shown below:

In the Specification

Column 13, line 28, delete "onboard" and insert -- on board --, therefor.

In the Claims

Column 15, line 3, in Claim 6, delete "of for" and insert -- of --, therefor.

Column 15, line 35, in Claim 8, delete "on;" and insert -- on: --, therefor.

Column 16, line 16, in Claim 14, delete "to;" and insert -- to: --, therefor.

Signed and Sealed this
Tenth Day of February, 2015

Michelle K. Lee
*Deputy Director of the United States Patent and Trademark Office*